(12) United States Patent
Verner (10) Patent No.: US 8,973,941 B2
(45) Date of Patent: Mar. 10, 2015

(54) VEHICLE INTERIOR TRIM PANEL

(71) Applicant: Nissan North America, Inc., Franklin, TN (US)

(72) Inventor: Sarah Verner, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 31 days.

(21) Appl. No.: 13/867,229

(22) Filed: Apr. 22, 2013

(65) Prior Publication Data

US 2014/0312600 A1 Oct. 23, 2014

(51) Int. Cl.
*B60R 21/213* (2011.01)
*B60R 13/02* (2006.01)
*B60N 3/02* (2006.01)

(52) U.S. Cl.
CPC .............. *B60R 13/025* (2013.01); *B60N 3/026* (2013.01); *B60R 13/0206* (2013.01); *B60R 21/213* (2013.01); *B60R 2013/0287* (2013.01)
USPC ..................................... 280/730.2; 280/728.3

(58) Field of Classification Search
USPC ........................................... 280/730.2, 728.3
See application file for complete search history.

(56) References Cited

U.S. PATENT DOCUMENTS

| | | | |
|---|---|---|---|
| 5,791,683 A * | 8/1998 | Shibata et al. ............. | 280/730.2 |
| 6,037,038 A | 3/2000 | Kuhr | |
| 6,079,732 A * | 6/2000 | Nakajima et al. .......... | 280/728.2 |
| 6,106,007 A * | 8/2000 | Kretschmer et al. ....... | 280/730.2 |
| 6,173,990 B1 * | 1/2001 | Nakajima et al. .......... | 280/730.2 |
| 6,257,616 B1 * | 7/2001 | Nowak et al. .............. | 280/730.2 |
| 6,302,434 B2 * | 10/2001 | Nakajima et al. .......... | 280/730.2 |
| 6,334,626 B2 * | 1/2002 | Nakajima et al. .......... | 280/730.2 |
| 6,364,346 B1 * | 4/2002 | Preisler et al. ............. | 280/730.2 |
| 6,367,872 B1 * | 4/2002 | Bohm et al. ................. | 296/214 |
| 6,485,048 B2 * | 11/2002 | Tajima et al. .............. | 280/728.2 |
| RE38,125 E * | 5/2003 | Shibata et al. ............. | 280/730.2 |
| 6,736,421 B2 * | 5/2004 | Blake et al. ................ | 280/730.2 |
| 6,761,374 B2 * | 7/2004 | Di Sante et al. ........... | 280/728.2 |
| 6,874,809 B1 | 4/2005 | Walter et al. | |
| 7,017,942 B2 * | 3/2006 | Elqadah et al. ............ | 280/730.2 |
| 7,100,939 B2 * | 9/2006 | Blake et al. ................ | 280/728.2 |
| 7,172,209 B2 * | 2/2007 | Totani et al. ............... | 280/728.2 |
| 7,641,227 B2 | 1/2010 | Choi | |
| 7,793,972 B2 | 9/2010 | Downey | |
| 7,850,197 B2 * | 12/2010 | Zucal et al. ................. | 280/728.3 |
| 7,931,295 B2 * | 4/2011 | Inui et al. ................... | 280/730.2 |
| 8,186,709 B2 * | 5/2012 | She ............................. | 280/730.2 |

(Continued)

FOREIGN PATENT DOCUMENTS

| | | |
|---|---|---|
| JP | 62-268731 A | 11/1987 |
| JP | 63-203446 A | 8/1988 |

(Continued)

*Primary Examiner* — Nicole Verley
(74) *Attorney, Agent, or Firm* — Global IP Counselors, LLP (57) ABSTRACT

A vehicle interior trim panel includes a main portion, a first side portion and a second side portion. The main portion includes a grip assist handle. The first side portion extends along a first side of the main portion. The second side portion extends along a second side of the main portion. The first side portion includes a hinged attachment section configured to attach to a first region of a vehicle body structure. The second side portion includes an attachment section configured to releasably attach to a second region of the A-pillar structure. The first side portion, the second side portion, the main portion and the grip assist handle are integrally formed as a single, one-piece, unitary, monolithic structure.

20 Claims, 9 Drawing Sheets

(56) References Cited

U.S. PATENT DOCUMENTS

| | | | |
|---|---|---|---|
| 8,231,170 B2 * | 7/2012 | Katayama et al. | 296/216.08 |
| 8,240,751 B2 * | 8/2012 | Katayama et al. | 296/216.07 |
| 8,317,221 B2 * | 11/2012 | Hemingway | 280/728.2 |
| 8,371,632 B2 * | 2/2013 | Akaba | 296/1.02 |
| 2001/0003400 A1 * | 6/2001 | Grimm et al. | 296/210 |
| 2004/0012173 A1 * | 1/2004 | Blake et al. | 280/730.2 |
| 2007/0096440 A1 * | 5/2007 | Purvis et al. | 280/728.3 |
| 2007/0176399 A1 * | 8/2007 | Kullack | 280/728.3 |
| 2008/0001384 A1 * | 1/2008 | Catron et al. | 280/730.2 |
| 2009/0267330 A1 * | 10/2009 | Glaser et al. | 280/728.3 |

FOREIGN PATENT DOCUMENTS

| | | |
|---|---|---|
| JP | 2008-155710 A | 7/2008 |
| JP | 2012-166663 A | 9/2012 |

* cited by examiner

VEHICLE INTERIOR TRIM PANEL

BACKGROUND

1. Field of the Invention

The present invention generally relates to a vehicle interior trim panel. More specifically, the present invention relates to a trim panel that is unitarily formed as a one piece element with a grip assist handle and is dimensioned and shaped to conceal an air bag assembly.

2. Background Information

A vehicle interior trim panel typically attaches to a structural member within a vehicle passenger compartment. For example, an A-pillar trim panel is shaped and configured to attach to and conceal an A-pillar of the vehicle. A-pillars are often provided with a fixedly attached grip assist handle providing passengers with something rigid to hold onto as they enter and exit the vehicle. The trim panel is typically provided with one or more openings such that a portion of the grip assist handle attaches to the pillar and extends through the opening in the trim panel.

Some grip assist handles require a bracket that is fixed to the A-pillar, with the grip assist handle being fixed to the bracket. In such a configuration, the trim panel covers the A-pillar and the bracket. However, when a curtain airbag is concealed behind the trim panel, the bracket can make packaging of the airbag behind the trim panel more challenging.

SUMMARY

One object is to provide a vehicle interior trim panel with a grip assist handle that is integrally and unitarily formed with the trim panel thereby eliminating the need for a separate bracket to support the grip assist handle.

Another object is to provide a vehicle interior trim panel that conceals an airbag assembly having a hinge attachment section that pivotally attaches one side of the trim panel to a vehicle pillar.

In view of the state of the known technology, one aspect is to provide a vehicle interior trim panel with a main portion, a first side portion and a second side portion. The main portion includes a grip assist handle. The first side portion extends along a first side of the main portion. The second side portion extends along a second side of the main portion. The first side portion includes a hinged attachment section configured to attach to a first region of a vehicle body structure. The second side portion includes an attachment section configured to releasably attach to a second region of the vehicle body structure. The first side portion, the second side portion, the main portion and the grip assist handle are integrally formed as a single, one-piece, unitary, monolithic structure.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
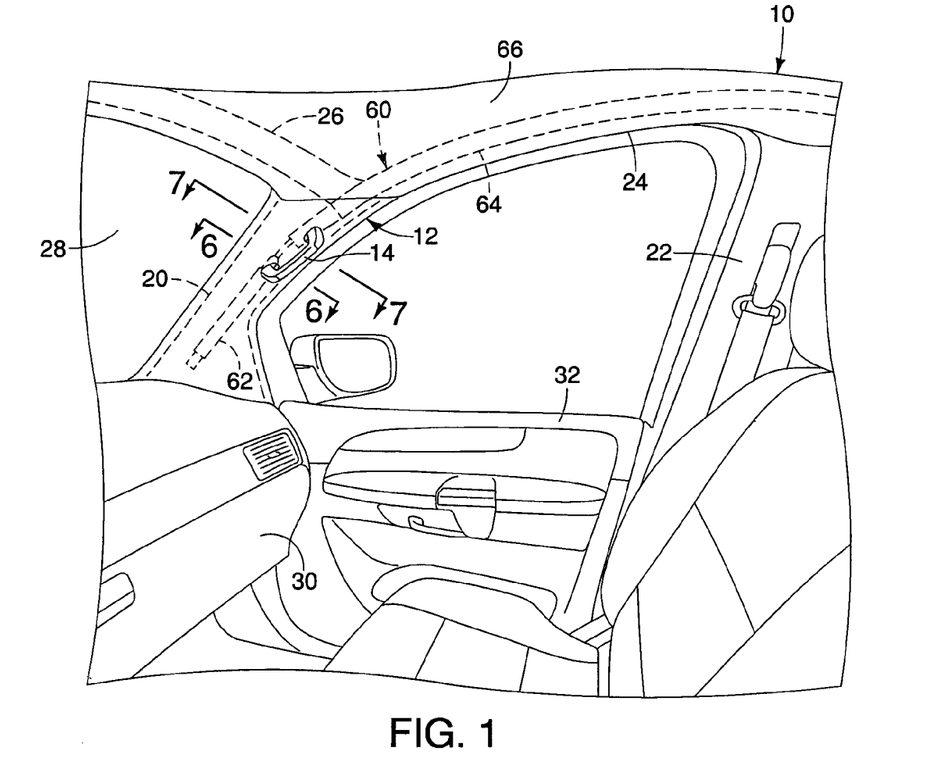
FIG. 1 is a perspective view of a vehicle showing an A-pillar and a trim panel attached to the A-pillar, the trim panel concealing an airbag assembly that is installed along an inner surface of the A-pillar in accordance with a first embodiment.

Referring initially to FIG. 1, a vehicle body structure 10 having an airbag concealing trim panel 12 is illustrated in accordance with a first embodiment. The trim panel 12 is formed with a grip assist handle 14. Features of the trim panel 12 and grip assist handle 14 are described below after a description of related elements of the vehicle body structure 10.

Figure 2:
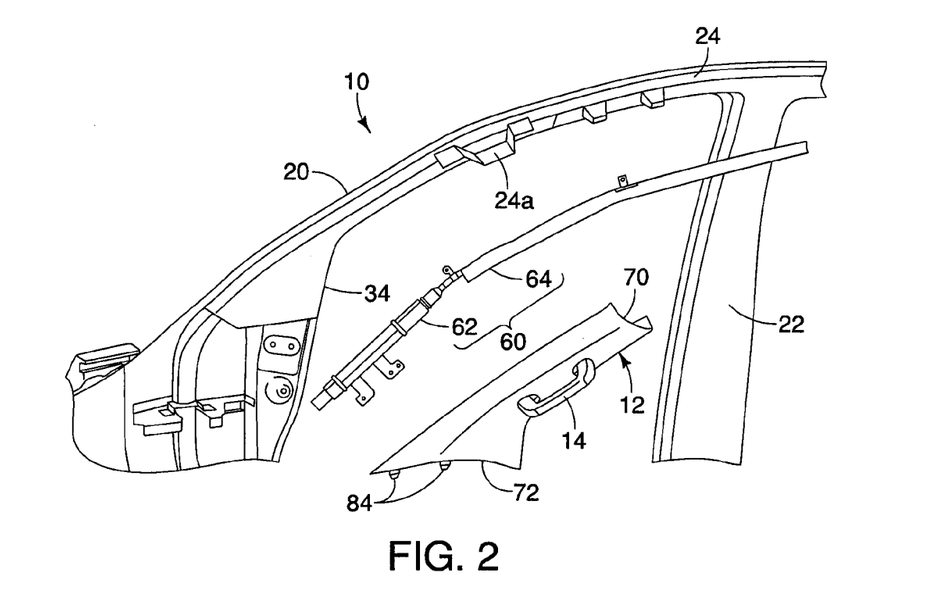
FIG. 2 is an exploded perspective view of the vehicle showing the A-pillar, the airbag assembly and the trim panel in accordance with the first embodiment.

As shown in FIGS. 1 and 2, the vehicle body structure 10 includes, among other elements, an A-pillar 20, a B-pillar 22, a roof rail 24, roof bow 26, a windshield 28, an instrument panel 30 and a door 32.

The A-pillar 20, the B-pillar 22, and the roof rail 24 at least partially define a door opening 34 (FIG. 2). The door 32 fills the door opening 34 when the door 32 is in a closed orientation (FIG. 1), and exposes the door opening 34 when the door 32 is in an open orientation. The roof bow 26, the A-pillar 20 and a dash wall (not shown) concealed by the instrument panel 30 define a windshield opening that receives and retains the windshield 28. As shown in FIGS. 2-5, the roof rail 24 includes a roof bow attachment flange 24a. The roof bow 26 is received by and is rigidly attached to the roof bow attachment flange 24a in a conventional manner. The B-pillar 22, the roof rail 24, the roof bow 26, the windshield 28, the instrument panel 30 and the front door 32 are conventional elements. Therefore, further description of these elements is omitted for the sake of brevity.

Figure 3:
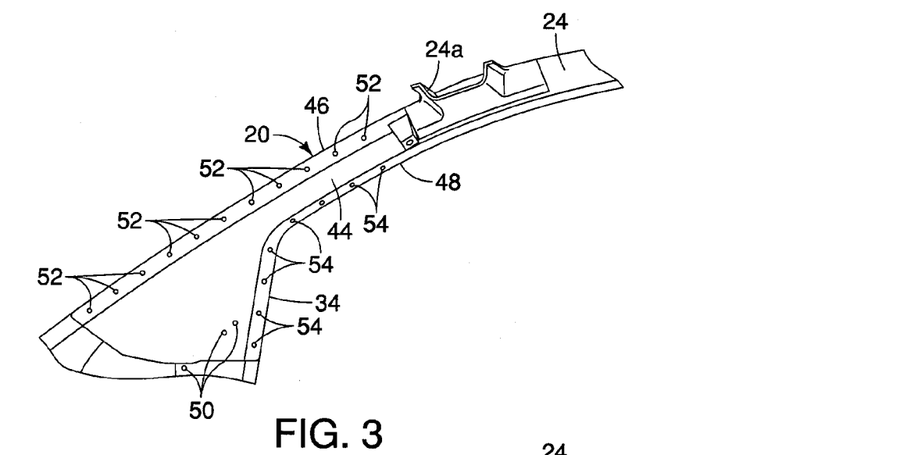
FIG. 3 is a side view of the A-pillar with the airbag and the trim panel removed in accordance with the first embodiment.
Figure 6:
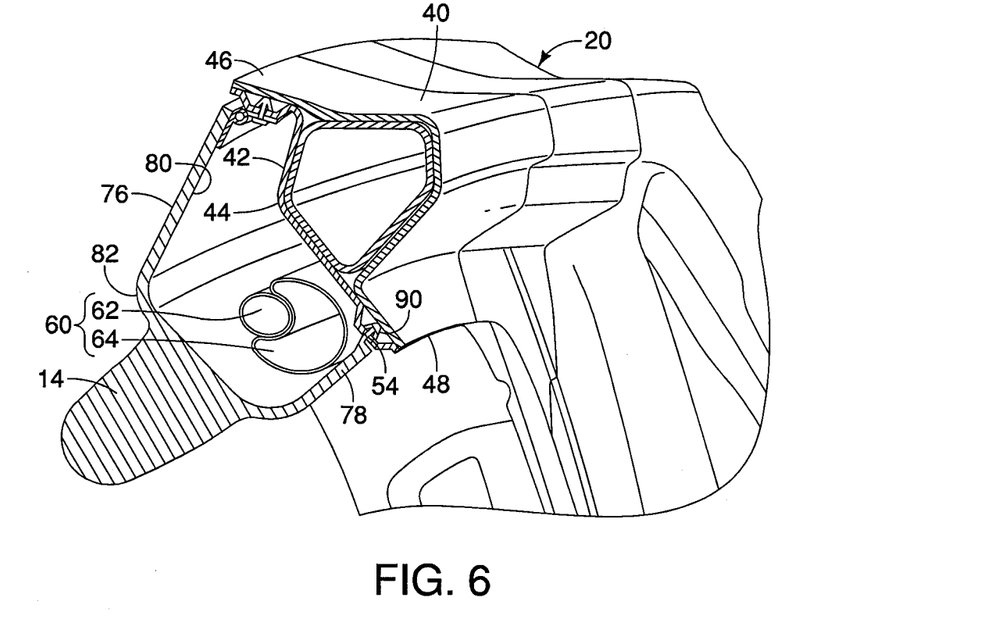
FIG. 6 is a cross-sectional view of the A-pillar and the trim panel taken along the line 6-6 in FIG. 1, showing a first side of the trim panel being attached to the A-pillar by a hinge assembly and a second side of the trim panel being attached to the A-pillar by snap fitting projections in accordance with the first embodiment.
Figure 7:
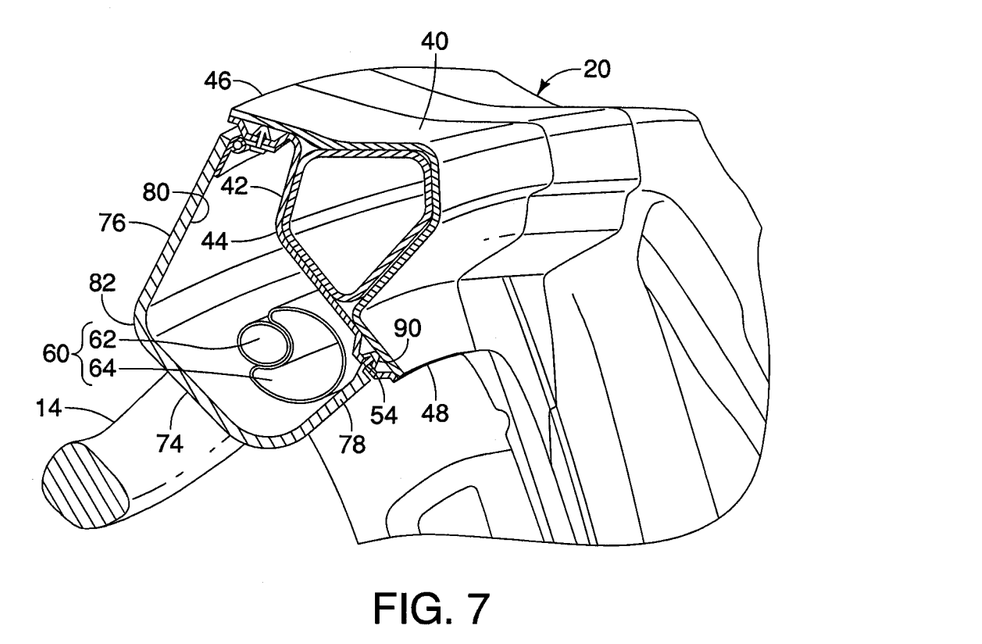
FIG. 7 is another cross-sectional view of the A-pillar and the trim panel taken along the line 7-7 in FIG. 1 in accordance with the first embodiment.

As is shown in FIGS. 6 and 7, the A-pillar 20 includes a plurality of panels that are welded together to define the A-pillar 20. For example, the A-pillar 20 includes an outer side panel 40 and an inner side panel 42 that are welded together to at least partially define the A-pillar 20. The A-pillar 20 extends from a sill (see FIG. 17) at the lower end of the door opening 34 up to the roof rail 24. Referring to FIGS. 3, 6 and 7, the A-pillar 20 has a passenger compartment facing surface 44, a windshield side 46 and a door side 48.

Referring now to FIG. 3, at a lower area of the passenger compartment facing surface 44 there are a plurality of first attachment apertures 50. At the windshield side 46 of the passenger compartment facing surface 44, the A-pillar 20 includes a plurality of second attachment apertures 52. At the door side 48 of the passenger compartment facing surface 44, the A-pillar 20 includes a plurality of third attachment apertures 54.

Figure 4:
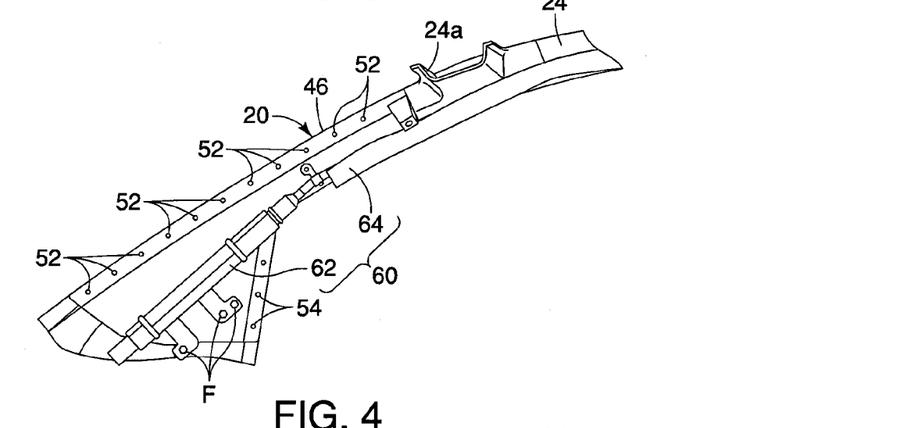
FIG. 4 is another side view of the A-pillar with the airbag installed to the A-pillar in accordance with the first embodiment.

As shown in FIG. 4, an airbag assembly 60 is attached to the passenger compartment facing surface 44 of the A-pillar and extends upward along the A-pillar 20. The airbag assembly 60 includes an inflation device 62 and an airbag 64. The inflation device 62 is attached to the passenger compartment facing surface 44 of the A-pillar 20 via fasteners F that are inserted through apertures in the inflation device 62 and further inserted into the first attachment apertures 50. However, it should be understood that other attachment configurations can be employed for the attachment of the inflation device 62 to the A-pillar 20. For example, rivets, snap-fitting clips, or other mechanical fastening devices can be used.

With the inflation device 62 installed to the A-pillar 20, the airbag 64 is rigidly fixed to and extends along an upper area of the A-pillar 20 and continues along a portion of the roof rail 24 as shown in FIG. 4 and indicated in FIG. 1. A perimeter portion of the airbag 64 is rigidly attached to the A-pillar and the roof rail 24 by conventional fasteners, but a remaining portion of the airbag 64 can be retained in a roll or an alternative packing arrangement along the A-pillar 20 and the roof rail 24 by frangible straps, tape, or other attachment members.

A description of the trim panel 12 is now provided with specific reference to FIGS. 5-12. The trim panel 12 is basically a molded member that is made of plastic and/or polymer materials with suitable strength to withstand the forces that are typically applied to the grip assist handle 14. The trim panel 12 basically includes an upper end 70, a lower end 72, a main portion 74, a first side portion 76 and a second side portion 78. As shown in cross-section in FIGS. 6 and 7, the main portion 74, the first side portion 76 and the second side portion 78 define a concave surface 80 dimensioned to conceal the airbag assembly 60, with the trim panel 12 installed to the A-pillar 20. The trim panel 12 also includes an outer surface 82. The grip assist handle 14 extends from the outer surface 82.

The main portion 74 extends between the upper end 70 and the lower end 72 but is wider at the lower end of the trim panel 12. The lower end 72 at the main portion 74 includes a pair of snap-fitting projection 84 that are positioned to attach to the instrument panel 30. The instrument panel 30 includes a pair of corresponding apertures (not shown) that receive the snap-fitting projections 84 thereby retaining the trim panel 12 after installation.

Figure 5:
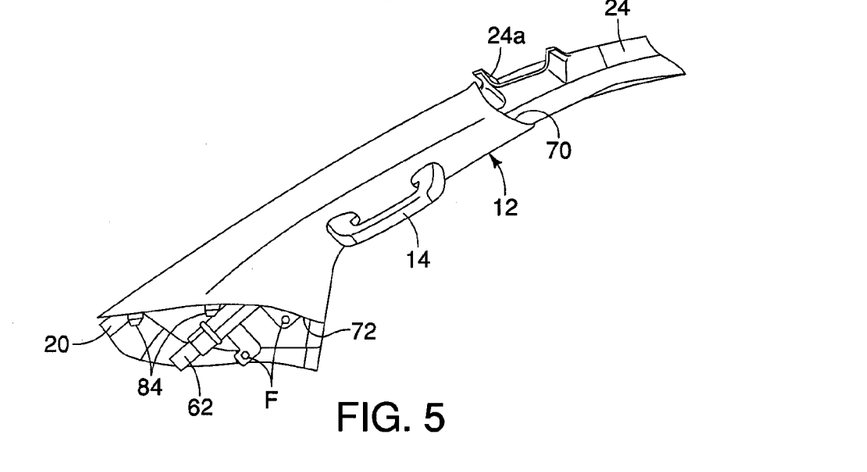
FIG. 5 is still another side view of the A-pillar with the trim panel installed to the A-pillar concealing the airbag assembly in accordance with the first embodiment.

As shown in FIG. 5, the inflation device 62 of the airbag assembly 60 extends below the lower end 72 of the trim panel 12. As shown in FIG. 1, the lower end 72 of the trim panel 12 is flush with an upper surface of the instrument panel 30. Therefore, the airbag assembly 60 is completely concealed behind the trim panel 12 and the instrument panel 30.

As shown in FIG. 6 in cross-section, the main portion 74 of the trim panel 12 also includes the grip assist handle 14, which is integrally formed therewith. In other words, the grip assist handle 14 is not a separate element attached to the main portion 74, but rather is integrally and uniformly formed with the main portion 74 as a single monolithic structure. Further, the first side portion 76, the second side portion 78, the main portion 74 and the grip assist handle 14 are all integrally formed as a single, one-piece, unitary, monolithic structure.

As shown in FIGS. 6 and 7, the main portion 74, the first side portion 76 and the second side portion 78 cooperate to define an overall U-shape in cross-section in the areas adjacent to the grip assist handle 14. The U-shape of the trim panel 12 is provided in order to cover and conceal the airbag assembly 60. More specifically, the main portion 74, the first side portion 76 and the second side portion 78 define the concave surface 80 which at least partially defines a concave space dimensioned to conceal the airbag assembly 60. Hence, the airbag assembly 60 is concealed between the A-pillar 20 and the trim panel 12 within the concave space defined by the concave surface 80.

The trim panel 12 is also configured and arranged such that in response to deployment of the airbag assembly 60, the second side portion 78 separates from the A-pillar 20 by the force of the inflation of the airbag 64 while the first side portion 76 remains attached to the A-pillar 20. The trim panel 12 then pivots in a manner depicted in FIGS. 8 and 9, and described below. The pivoting movement of the trim panel 12 allows the airbag 64 to completely inflate and extend rearward and downward, covering most, if not all, of the window in the door 32, as is depicted in FIG. 10.

Figure 11:
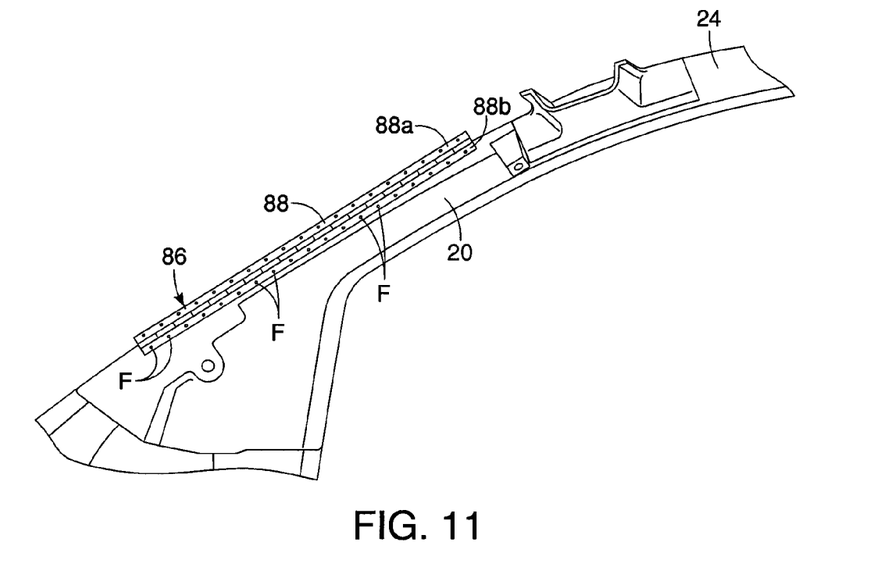
FIG. 11 is a side view of the A-pillar showing the hinge assembly of the trim panel removed from the trim panel and attached to the A-pillar by a plurality of fasteners in accordance with the first embodiment.
Figure 12:
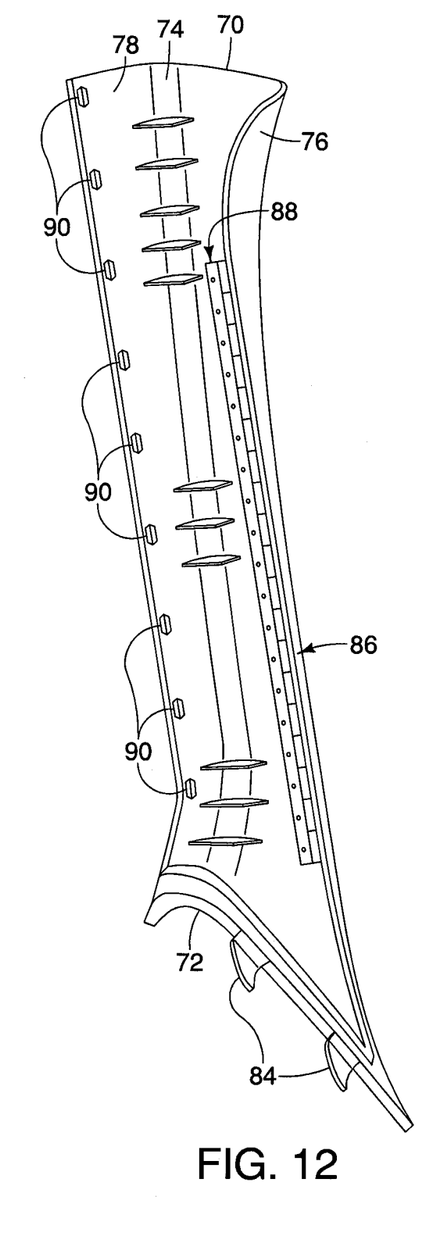
FIG. 12 is a side view of the trim panel showing the hinge assembly attached to the first side of the trim panel and the snap fitting projections at the second side of the trim panel in accordance with the first embodiment.
Figure 13:
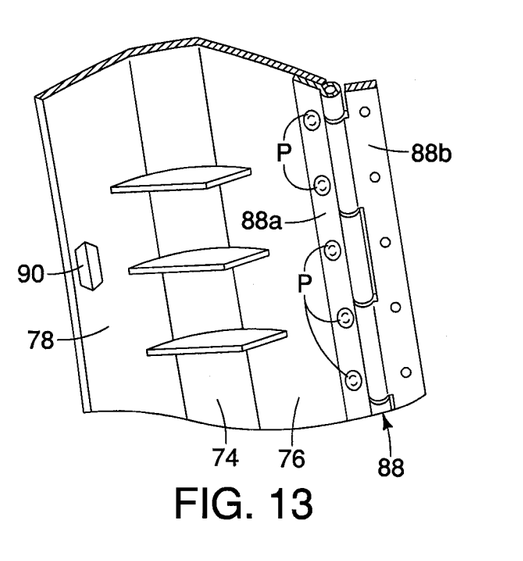
FIG. 13 is an enlarged side view of the trim panel showing further detail of the hinge assembly attachment to the first side of the trim panel in accordance with the first embodiment.
Figure 14:
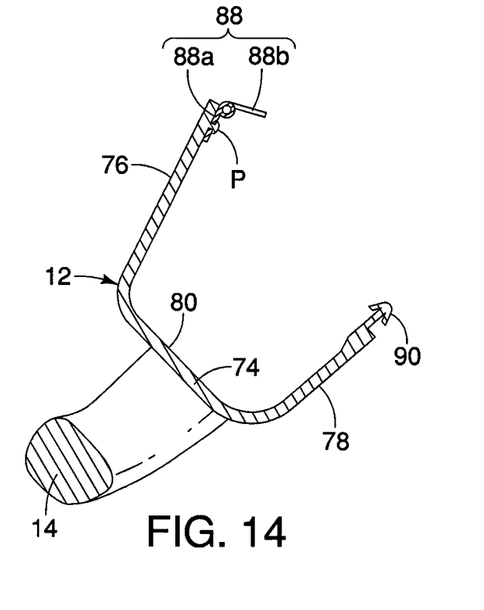
FIG. 14 is a cross-sectional view of the trim panel shown removed completely from the A-pillar and showing the hinge assembly attached to the first side of the trim panel in accordance with the first embodiment.

The first side portion 76 extends along a first side of the main portion 74 from the upper end 70 to the lower end 72. As shown in FIG. 11, the first side portion 76 includes a hinged attachment section 86 that attaches to the A-pillar 20 at the windshield side 46 thereof. The hinged attachment section 86 basically includes a single elongated hinge 88 that extends from and area proximate to the upper end 70 of the first side portion 76 to an area proximate to the lower end 72 of the first side portion 76. As shown in FIGS. 12 and 13, the single elongated hinge 88 includes a first extending section 88*a* that is fixedly attached to the first side portion 76 along the edge thereof, and a second extending section 88*b* that attaches to the A-pillar 20. The first extending section 88*a* includes a plurality of apertures that correspond to pins P formed along the first side portion 76. The pins P align with and extend into the apertures of the first section 88*a*. As indicated in FIGS. 8, 9, 13 and 14, the distal ends of the pins P have been partially melted and cooled forming a plurality of heads. The heads are larger than the apertures in the first section 88*a*. Hence, the melted and cooled pins P fixedly attach the first section 88*a* of the hinge 88 to the trim panel 12.

The first and second extending sections 88*a* and 88*b* pivot with respect to one another about a pivot pin that connects the first and second extending sections 88*a* and 88*b* together in a conventional manner.

Figure 8:
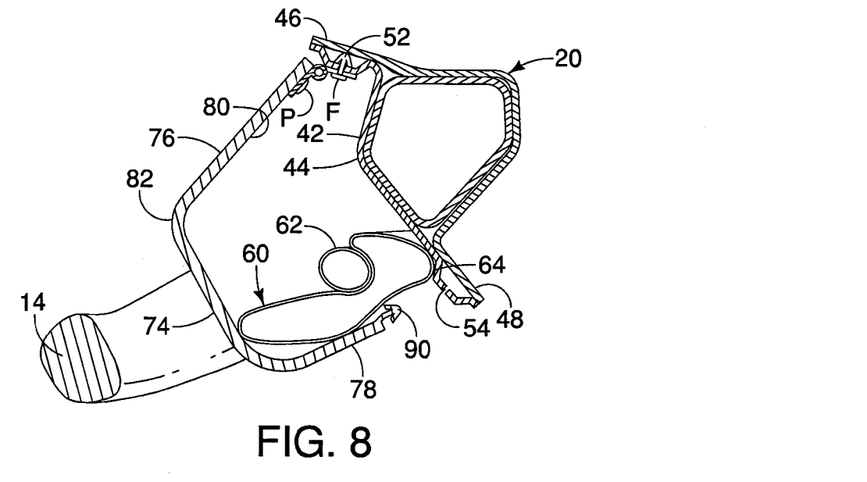
FIG. 8 is another cross-sectional view of the A-pillar similar to FIG. 7 showing the airbag in an early stage of deployment with the second side of the trim panel beginning to release from the A-pillar and the hinge assembly, allowing the trim panel to pivot relative to the A-pillar in accordance with the first embodiment.
Figure 9:
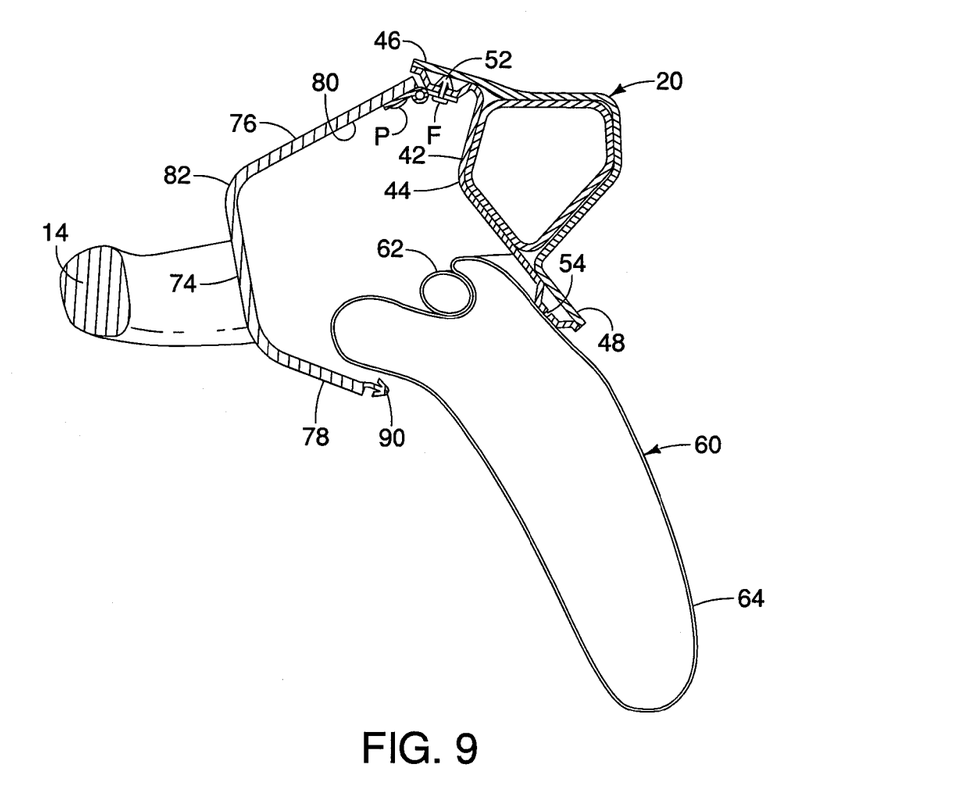
FIG. 9 is another cross-sectional view of the A-pillar similar to FIGS. 7 and 8, but showing the airbag fully deployed with the second side of the trim panel completely released from the A-pillar and the hinge assembly allowing the trim panel to further pivot relative to the A-pillar in accordance with the first embodiment.
Figure 10:
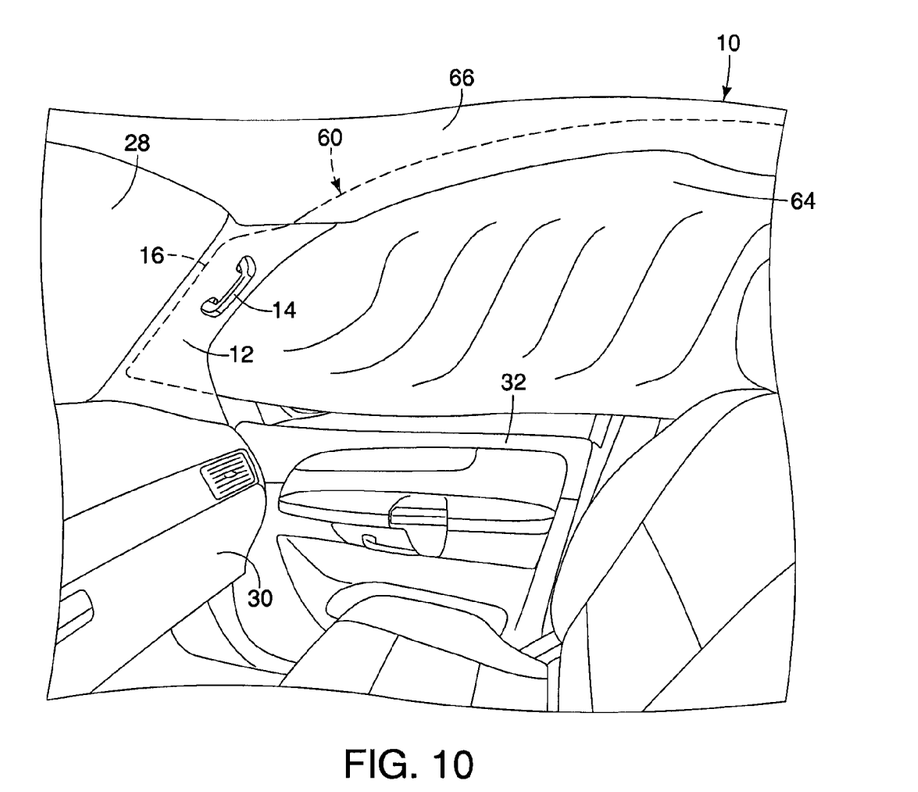
FIG. 10 is a perspective view of the vehicle similar to FIG. 1, showing the airbag fully deployed and at least partially covering a door window of the vehicle in accordance with the first embodiment.

The second section 88*b* of the hinge 88 is attached to the windshield side 46 of the A-pillar 20 via fasteners F that extend through corresponding apertures in the second section 88*b* of the hinge 88, as indicated in FIGS. 8 and 9 and further into the second attachment apertures 52 at the windshield side 46 of the A-pillar 20. Alternatively, the second section 88*b* can be attached to the windshield side 46 of the A-pillar 20 via a welding process as shown in FIGS. 6 and 7.

FIG. 11 shows the second section 88*b* of the hinge 88 attached to the A-pillar 20 via a plurality of fasteners F. The fasteners F can be threaded members, such as sheet metal type screws, rivets or snap-fitting projections.

The second side portion 78 of the trim panel 12 extends along the main portion 74 of the trim panel 12 from the upper end 70 to the lower end 72. The second side portion 78 includes an attachment section having a plurality of snap fitting projections 90 formed thereon, as indicated in FIG. 12. The snap fitting projections 90 are positioned adjacent to and then inserted into the third attachment apertures 54 at the door side 48 of the A-pillar 20, as shown in FIGS. 6 and 7. The snap fitting projections 90 releasably attach the second side portion 78 of the trim panel 12 to the A-pillar 20 at the door side 48 thereof.

More specifically, as shown in FIG. 8, in response to deployment and inflation of the airbag 64, the force of the airbag 64 being inflated is sufficient to break the plurality of snap-fitting projections 90 or cause the plurality of snap-fitting projections 90 to withdraw from the third attachment apertures 54, thereby releasing the second side portion 78 from the A-pillar 20. In other words, the snap-fitting projections 90 are pulled out of the third attachment apertures 54 by the force of airbag deployment. Alternatively, the snap-fitting projections 90 can be formed with frangible sections or breakaway sections that break in response to the force of airbag deployment.

During the initial stages of airbag deployment, as shown in FIG. 8, the second side portion 78 is released from the A-pillar. As deployment (inflation) of the airbag 64 continues, as shown in FIG. 9, the trim panel 12 pivots about the hinge 88 such that the trim panel 12 moves out of the way such that the airbag 64 can easily inflate and cover the window of the door 32, as shown in FIG. 10.

As described above, the grip assist handle 14 is integrally formed with the trim panel 12 as a single unitary element. In many conventional trim panel and grip assist handle arrangements, the grip assist handle is a separate element from the trim panel. In such conventional arrangements, special brackets behind the trim panel are required to attach the conventional grip assist handle to the conventional A-pillar. However, in the above described configuration, no such brackets are necessary because the grip assist handle 14 is seamlessly formed with the trim panel 12. Therefore, the grip assist handle 14 is fixedly attached to the A-pillar 20 via the trim panel 12, in the absence of any other structural elements. This allows for a convenient space behind the trim panel 12 where the inflation device 62 and the airbag 64 of the airbag assembly 60 are easily concealed. The hinge 88 is configured to withstand all of the forces normally applied to the grip assist handle 14 by vehicle passengers. Since the hinge 88 is fixedly attached to the trim panel 12 and fixedly attached to the A-pillar 20, forces applied to the grip assist handle 14 are transferred directly to the hinge 88 and to the A-pillar 20. Further, forces applied to the grip assist handle 14 from a variety of directions by a vehicle passenger gripping the grip assist handle 14 are likewise transferred to the A-pillar 20 such that the second side portion 78 experiences only a small portion of the applied loads. Additionally, while the trim panel 12 is shown attached to the A-pillar 20 of the vehicle body structure 10, the trim panel 12 can be sized and shaped to attach to a B-pillar, C-pillar or another location on the vehicle body structure 10.

Second Embodiment

Figure 15:
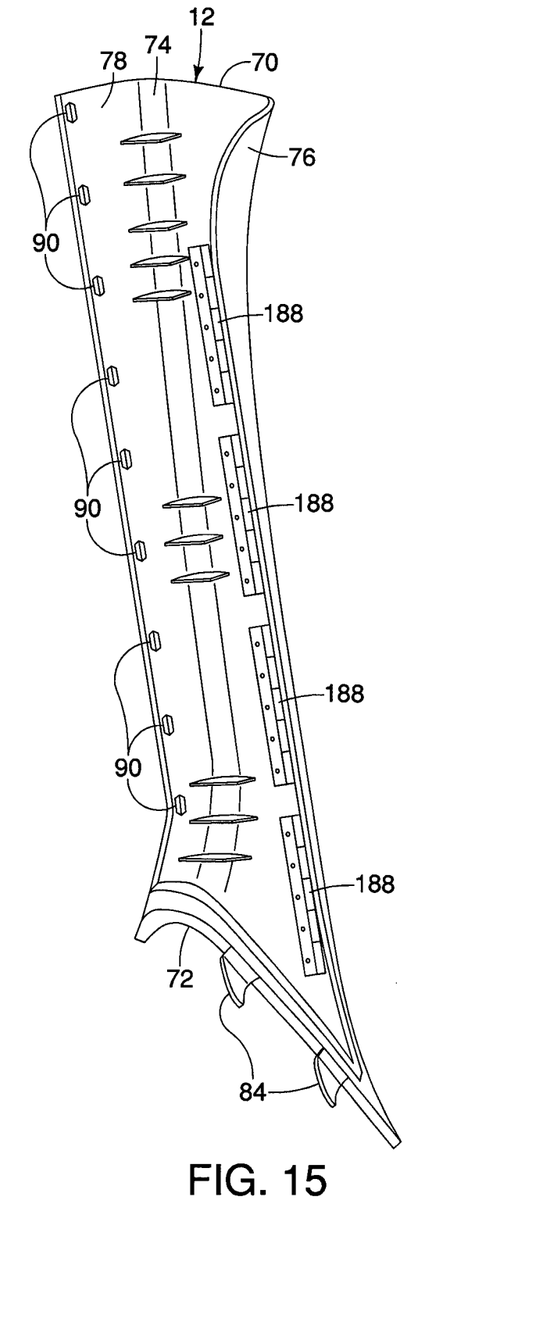
FIG. 15 is a side view of a trim panel showing a plurality of hinge assemblies attached to a first side of the trim panel in accordance with a second embodiment.

Referring now to FIG. 15, the trim panel 12 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the trim panel 12 remains unchanged relative to the first embodiment. However, in the second embodiment, the hinge 88 is removed and replaced with a plurality of smaller hinges 188. The plurality of hinges 188 are attached to the first side 76 of the trim panel 12 in a manner identical to the attachment of the hinge 88 in the first embodiment. Similarly, the plurality of hinges 188 are attached to the A-pillar 20 in a manner identical to the attachment of the hinge 88 in the first embodiment.

Third Embodiment

Figure 16:
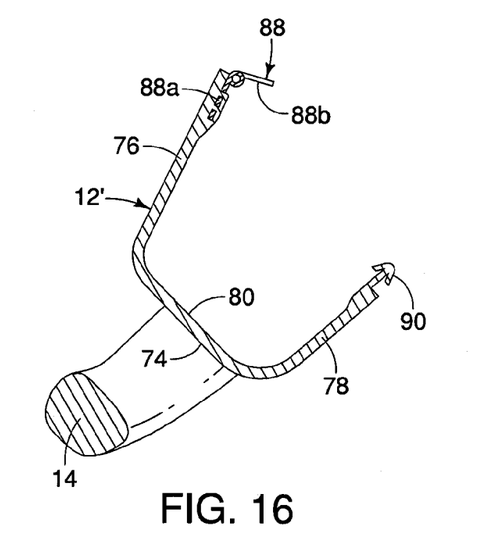
FIG. 16 is a cross-sectional view of a trim panel shown removed completely from the A-pillar and showing a hinge assembly attached to the first side of the trim panel in accordance with a third embodiment.

Referring now to FIG. 16, a trim panel 12' in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the trim panel 12' and the hinge 88 are identical to the trim panel 12 and the hinge 88 of the first embodiment, except that the hinge 88 is attached to the first side portion 76 of the trim panel 12' in a different manner. Specifically, the extending section 88*a* of the hinge 88 is embedded within the first side portion 76 along the edge thereof. In other words, during the molding process in which the trim panel 12' is formed, the extending section 88*a* is positioned in a mold, and the material used to form the trim panel 12' is solidified around the extending section 88*a* and includes extensions of the material that fill in apertures in the extending section 88*a*.

Fourth Embodiment

Figure 17:
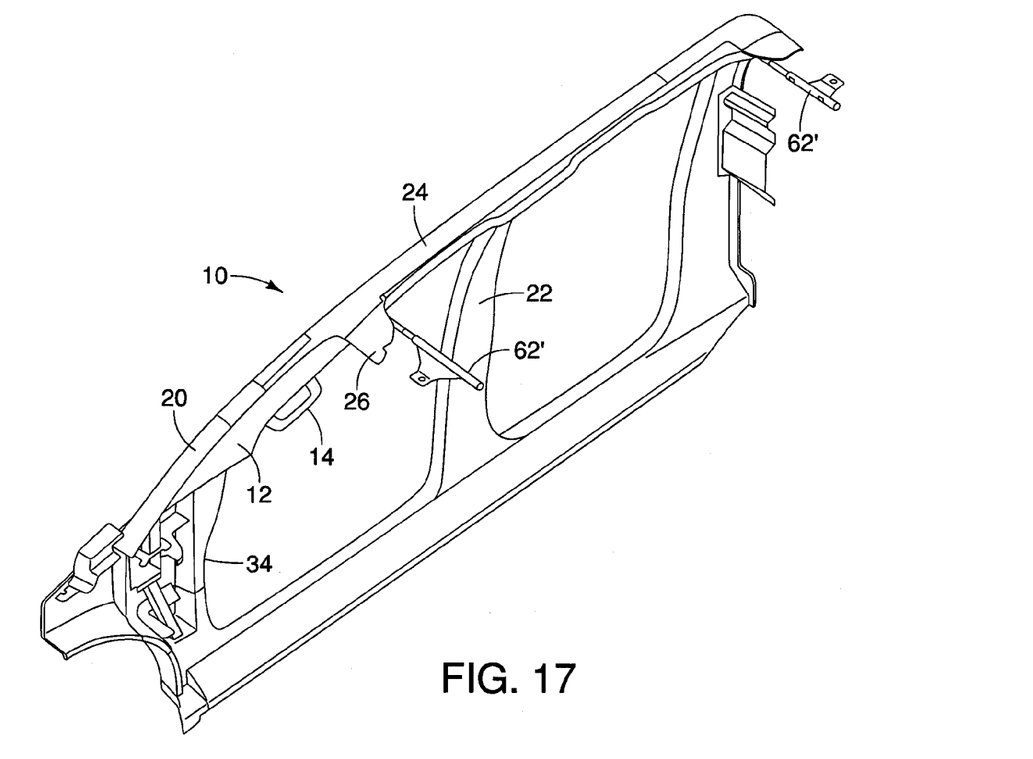
FIG. 17 is a perspective view of a portion of a vehicle showing two inflation devices of an airbag assembly positioned for installation to roof bows of the vehicle in accordance with a fourth embodiment.
Figure 18:
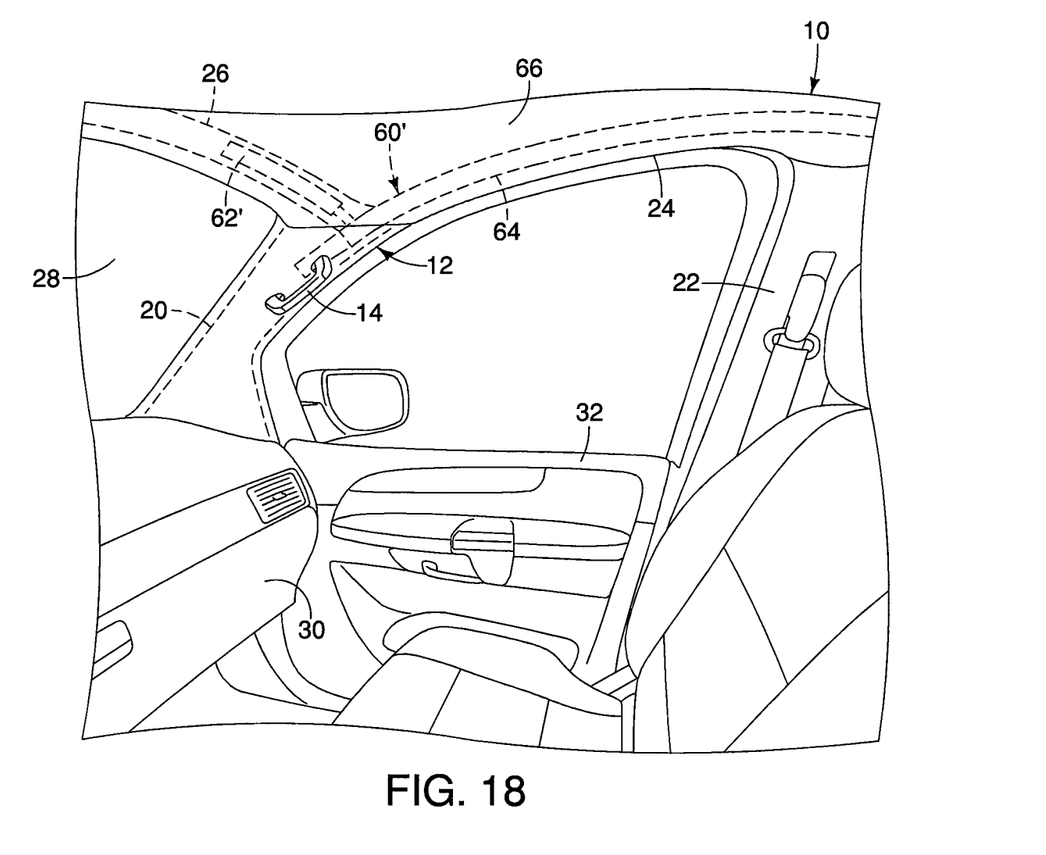
FIG. 18 is a perspective view of the vehicle showing an A-pillar and a trim panel attached to the A-pillar, the trim panel concealing an airbag that is installed along an inner surface of the A-pillar with one of the inflation devices being installed along a front one of the roof bows in accordance with the fourth embodiment.

Referring now to FIGS. 17 and 18, the vehicle body structure 10 includes the trim panel 12 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the vehicle body structure 10 and the trim panel 12 are identical to that described in the first embodiment, except that the airbag assembly 60 is replaced with a different airbag assembly 60'. The airbag assembly 60 of the first embodiment included the inflation device 62 located along the passenger compartment facing surface 44 of the A-pillar 20. In the fourth embodiment, the airbag assembly 60' includes inflation devices 62' that are concealed by the headliner 66 of the vehicle body structure 10. More specifically, one of the inflation devices 62' is installed to the roof bow 26 spaced apart from the airbag 64 and located behind the trim panel 12. The locations of the inflation devices 62' are a matter of convenience and packaging and depend upon the overall design and configuration of the vehicle body structure 10. Further a second one of the inflation devices 62' can be located at the rear of the vehicle body structure 10, as shown in FIG. 17, which can correspond to a location of a rearward roof bow (not shown) of the vehicle body structure 10.

The airbag assemblies 60 and 60' include triggering devices or controllers (not shown) that can be located anywhere within the vehicle body structure 10. Since such triggering devices or controllers are conventional features, further description is omitted for the sake of brevity.

The inflation devices 62 and 62' of the airbag assemblies 60 and 60' in the above embodiments are conventional components that are well known in the art. Since airbag assemblies are well known in the art, these devices will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle interior trim panel. Accordingly, these terms, as utilized to describe the present invention should be interpreted relative to a vehicle equipped with the vehicle interior trim panel.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle interior trim panel comprising
a main portion with a grip assist handle,
a first side portion extending along a first side of the main portion; and
a second side portion extending along a second side of the main portion, wherein
the first side portion includes a hinged attachment section configured to attach to a first region of a vehicle body structure, the hinged attachment section comprising a single elongated hinge extending from an area proximate to an upper end of the first side portion to an area proximate to a lower end of the first side portion,
the second side portion includes an attachment section configured to releaseably attach to a second region of the vehicle body structure, and
the first side portion, the second side portion, the main portion and the grip assist handle are integrally formed as a single, one-piece, unitary, monolithic structure.

2. The vehicle interior trim panel according to claim 1, wherein
the main portion, the first side portion and the second side portion cooperate to define a U-shape in cross-section in areas adjacent to the grip assist handle.

3. The vehicle interior trim panel according to claim 1, wherein
the first side portion, the second side portion and the main portion at least partially cooperate to define a concave space dimensioned to conceal an airbag device.

4. The vehicle interior trim panel according to claim 3, wherein
the attachment section of the second side portion includes a plurality of snap-fitting projections configured to release from the vehicle body structure in response to airbag deployment.

5. The vehicle interior trim panel according to claim 3, wherein the attachment section of the second side portion includes a plurality of frangible fasteners configured to separate from the second side portion in response to airbag deployment.

6. The vehicle interior trim panel according to claim 1, wherein
the single elongated hinge includes an extending section that is embedded within the first side portion.

7. The vehicle interior trim panel according to claim 6, wherein
the single elongated hinge includes an extending section embedded within the first side portion.

8. A vehicle comprising:
an A-pillar having a passenger compartment facing surface, a windshield side and a door side;
an airbag assembly extending along the passenger compartment facing surface of the A-pillar;
a hinge having a first section and a second section movably connected to one another for pivotal movement about a pivot pin; and
a trim panel movable between an airbag concealing orientation and an airbag deployed orientation, the trim panel having a main portion, a first side portion and a second side portion that cooperate to define a concave surface dimensioned to conceal the airbag assembly with the trim panel being in the airbag concealing orientation,
the main portion include a grip assist handle, the first side portion being attached to the first section of the hinge, the second section of the hinge being attached to the A-pillar structure at the windshield side thereof, and the second side portion includes an attachment section releaseably attached to the A-pillar at the door facing side such that in the airbag concealing orientation the second side portion is releaseably attached to the A-pillar at the door facing side, and in the airbag deployed orientation the second side portion is detached from the A-pillar, the trim panel pivoting about the pivot pin of the hinge during movement between the airbag concealing orientation and the airbag deployed orientation upon deployment of the airbag assembly, and
the first side portion, the second side portion, the main portion and the grip assist handle are integrally formed as a single, one-piece, unitary, monolithic structure such that the grip assist handle pivots with the trim panel during movement between the airbag concealing orientation and the airbag deployed orientation.

9. The vehicle according to claim 8, wherein
the main portion, the first side portion and the second side portion cooperate to define a U-shape in cross-section in areas adjacent to the grip assist handle.

10. The vehicle according to claim 8, wherein
the attachment section of the second side portion includes a plurality of snap-fitting projections configured to release from the A-pillar structure in response to airbag deployment.

11. The vehicle according to claim 8, wherein
the attachment section of the second side portion includes a plurality of frangible fasteners configured to separate from the second side portion in response to airbag deployment.

12. The vehicle according to claim 8, wherein
the hinge comprises a single elongated hinge extending from an area proximate to an upper end of the first side portion to an area proximate to a lower end of the first side portion.

13. The vehicle according to claim 12, wherein
the single elongated hinge includes an extending section that is embedded within the first side portion.

14. The vehicle according to claim 8, wherein
the hinge comprises a plurality of spaced apart hinges attached to the first side portion.

15. The vehicle according to claim 14, wherein
the second section of each of the plurality of hinges is embedded within the first side portion.

16. A vehicle comprising:
an A-pillar having a passenger compartment facing surface, a windshield side and a door side;
an airbag assembly extending along the passenger compartment facing surface of the A-pillar;
a hinge having a first section and a second section movably connected to one another for pivotal movement about a pivot pin; and
a trim panel movable between an airbag concealing orientation and an airbag deployed orientation, the trim panel having a main portion, a first side portion and a second side portion that cooperate to define a concave surface dimensioned to conceal the airbag assembly in the airbag concealing orientation,
the first side portion being attached to the first section of the hinge, the second section of the hinge being attached to the A-pillar structure at the windshield side thereof, and the second side portion of the trim panel including an attachment section such that in the airbag concealing orientation the second side portion is releaseably attached to the A-pillar at the door facing side, and in the airbag deployed orientation the second side portion is detached from the A-pillar, the trim panel pivoting about the pivot pin of the hinge during movement between the airbag concealing orientation and the airbag deployed orientation upon deployment of the airbag assembly,
the main portion including a grip assist handle fixedly attached to a section of the main portion of the trim panel, the airbag assembly being located directly between the passenger compartment facing surface of the A-pillar and the section of the main portion having the grip assist handle with the trim panel in the airbag concealing orientation, the grip assist handle being fixedly attached to the main portion of the trim panel such that forces applied to the grip assist handle from within the passenger compartment are transferred directly to the trim panel and to the hinge, and further directly transferred to the A-pillar via the hinge.

17. The vehicle according to claim 16, wherein
the first side portion, the second side portion, the main portion and the grip assist handle are integrally formed as a single, one-piece, unitary, monolithic structure.

18. The vehicle according to claim 16, wherein
the second section of the hinge is embedded within the first side portion of the trim panel.

19. The vehicle according to claim 16, wherein
the hinge comprises a plurality of spaced apart hinges attached to the first side portion of the trim panel.

20. The vehicle according to claim 19, wherein
each of the plurality of spaced apart hinges includes a corresponding second section that is embedded within a corresponding area of the first side portion of the trim panel.

* * * * *